United States Patent Office 3,544,504
Patented Dec. 1, 1970

3,544,504
INSULATING AMIDE-IMIDE POLYMERIC MAGNETIC WIRE COATING COMPOSITION
William W. Ulmer, Muskegon, Mich., assignor to Anaconda Wire and Cable Company, New York, N.Y., a corporation of Delaware
No Drawing. Filed Jan. 4, 1967, Ser. No. 607,139
Int. Cl. C08g 51/34, 51/40; H01b 3/30
U.S. Cl. 260—31.2                 10 Claims

ABSTRACT OF THE DISCLOSURE

The thermoplastic flow, burnout, and smoothness of an amide-imide polymeric coating of a magnetic wire is substantially improved by the addition of benzyl benzoate and/or 1,4 butanediol in the initial coating composition.

BACKGROUND OF THE INVENTION

Field of the invention

This invention relates to magnet wire coating composition and the resultant magnet wire. More particularly, it relates to the use of at least one of the following additives in an amide-imide magnet wire coating composition:

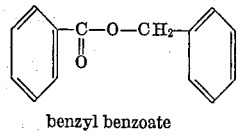

benzyl benzoate and $HOCH_2CH_2CH_2CH_2OH$
1,4 butanediol

Description of the prior art

Amide-imide polymeric coating composition has been used for the manufacturing of an all-purpose magnet wire. Heretofore, acetanilide has been used as an additive to the solvent system of the amide-imide polymeric coating composition to improve the smoothness, thermoplastic flow temperature, and the burnout characteristics of the resultant insulation coating of the magnet wire. Acetanilide is a crystalline substance having a boiling point at 302° C. and is soluble in N-methyl pyrrolidone or other solvents for the amide-imide polymer.

In the manufacturing of amide-imide insulated magnet wire, the solvent of the coating composition is generally recovered by condensing the evaporated solvent. The presence of acetanilide in the solvent system, however, renders its recovery ineffective and oftentimes impossible. The failure is caused by the recrystallization of acetanilide in the condenser. The recrystallized acetanilide coats on the pipes in the condenser and gradually plugs up the gaseous passages after two to three hours.

SUMMARY OF THE INVENTION

I have now found that the use of acetanilide can be eliminated without sacrificing the physical characteristics of the resultant amide-imide polymeric coating of the magnet wire. The invention is based on the discovery that at least one of the following additives, when it is used in combination with the existing amide-imide polymeric coating composition, substantially improves the smoothness, burnout characteristics and thermoplastic flow temperature of the resultant coating without the use of an acetanilide additives.

Broadly stated, the magnet wire coating composition of this invention comprises (a) an amide-imide polymer, (b) a solvent system for the polymer, and (c) up to 15% by weight of 1,4-butanediol and up to 30% by weight of benzyl benzoate. The composition has about 5%-35% by weight of polymeric solids. The magnet wire coated with this composition has excellent physical properties and particularly the surface smoothness, thermoplastic flow temperature, and burnout resistance.

DESCRIPTION OF THE PREFERRED EMBODIMENT

The polyamide-imide wire enamel suitable for the preparation of the magnet wire coating composition of the present invention includes solutions of polymers containing both amide and imide linkages and repeating units of

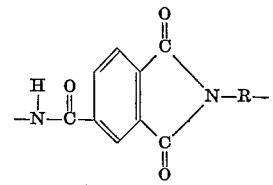

wherein R is a residue of an organic diamine.

The polyamide-imide may be prepared by copolymerization of an acyl halide derivative of trimellitic anhydride (1,2,4-benzene tricarboxylic acid anhydride) and an aromatic primary diamine. The polymeric products may have the following structure:

(A)

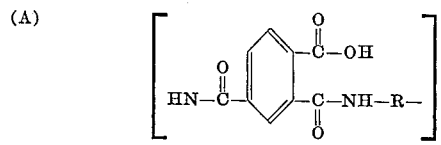

and (B)

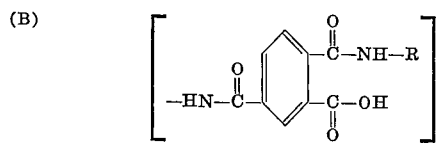

wherein R is the aromatic nucleus of the starting diamine, $H_2HRNH_2$. The linking groups are probably predominantly amido although some may be imido. The polymeric structure may also contain free carboxyl groups which are capable of further reaction. When the enamel is further reacted, for example, in the manufacture of the magnet wire the above-stated reaction products (A) and (B) are to form polymer conforming to the structure of

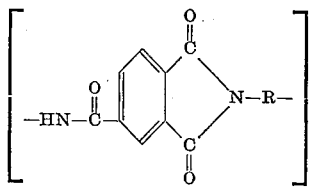

The free carboxyl groups initially present in the polymeric structure are to a substantial extent converted to imide groups by condensation with available amide groups.

The acyl halide derivatives of trimellitic anhydride that are suitable for preparing the aforementioned polyamide-imide polymer have at least one acyl halide group in the 4-ring position. They include, for example, 4-acid chloride, 1,4 and 2,4-diacid chloride (with an ester in the remaining position) and 1,2,4-triacid chloride. The bromides and other reactive halide derivatives are also suitable.

The aromatic diamine that may be used for preparing polyamide-imide enamel preferably have one or more aromatic rings and two primary amino groups. The aromatic diamines having more than one aromatic ring may be polycyclic aromatic compounds having amino groups on an interconnected polycyclic aromatic nucleus.

Specific examples on how the polyamide-imide polymers are prepared are described in greater detail in Netherlands Pat. No. 6400422.

The amount of additives, benzyl benzoate and 1,4 butanediol that may be used vary according to the polyamide-polyimide enamel used. In general, the presence of even a trace amount of one of these two additives will provide beneficial results. I found as much as 15% by weight of 1,4 butanediol and up to about 30% by weight of benzyl benzoate may be used in preparing the coating composition of this invention.

The additives preferably are added into the coating composition during the preparation of the amide-imide polymer in a solvent. The resultant composition may be adjusted for viscosity and other additives, such as dicyandiamide and triphenyl phosphite, may also be added. The addition of acetanilide, however, is no longer required.

Further to illustrate this invention specifiic examples are described hereinbelow. In these examples, the amide-imide polymer, unless otherwise specified, was prepared by reacting trimellitic anhydride and p,p' methylene-bis-(aniline) in N-methyl-pyrrolidone and dimethyl octamide. The enamel containing 20%–28% solids was further diluted with WES oil (a semi-refined coal tar distillate having a specific gravity of 0.930–0.950 and which distills 95% to not above 235° C.) to a suitable viscosity for smooth application.

The testing of the wire in accordance with the present invention which gave the results illustrated below was performed according to standard testing procedures which are well described in publications of the American Society for Testing Materials, the American Standard Association, the American Institute of Electrical Engineers and military specifications.

EXAMPLE I

30% by weight of benzyl benzoate was added into and mixed with an amide-imide polymeric coating composition containing 0.3% by weight of dicyandiamide and 0.3% by weight of triphenyl phosphite. After thoroughly mixing, the coating composition was used in the manufacturing of magnet wires using a vertical oven at the feed rate of 18 feet per minute at three different baking temperatures, 400° C., 430° C., and 460° C. A total of six coats were applied. The results are tabulated hereinbelow:

TABLE I

| Test | 400° C. | 430° C. | 460° C. |
|---|---|---|---|
| Coating surface | Smooth | Smooth | Smooth |
| Snap | +3X OK | +5X OK | +5X OK |
| 20% stretch | +2X OK | | |
| 20% flex | | 3X, 2X, 1X OK | |
| G.E. scrape | 100+ | 91 ave | 100+ |
| ITC scrape | 1,008 | 810 ave | 957 ave |
| DMAC solution | OK | OK | OK |
| Heat shock [1] | All OK | All OK | All OK |
| Build (mils) | 1.7 | 2.2 | 2.2 |

[1] 1 hr. at 250° C.

In the coating process, it was noted benzyl benzoate, which boils at 324° C., was condensed as liquid and did not hinder the recovery of the solvent. A portion of benzyl benzoate was recovered.

EXAMPLE II

The amide-imide polymeric enamel which contained 28% solids in a solvent consisting of 75% N-methyl pyrrolidone and 25% WES oil, having a viscosity of 70 poises, was used to prepare magnet wires of 18 AWG copper conductors on a horizontal 12-ft. coating unit using a typical formulation as follows:

|  | Percent by weight |
|---|---|
| Amide-imide polymer plus about 0.5 triphenyl phosphite and 0.3 dicyandiamide | 70 |
| Benzyl benzoate | 25 |
| 1,4 butanediol | 5 |

The wire was fed at a rate of 20 feet per minute and the oven operated at 405° C. The resultant magnet wire had a smooth coating surface; 2.0 mil build; full snap +5X OK; G.E. scrape 100+; 20% elongation 3X, 2X OK; heat shock 20% 3X, 2X OK; ITC scrape 960 Ave.; 40% elongation; no crack; no lift.

When the oven temperature was increased to 420° C., the resultant magnet wire had the following test result:

| Build | 1.9 mil. |
|---|---|
| Coating surface | Smooth. |
| ITC scrape | 996 Ave. |
| G.E. scrape | 100+. |
| Snap | +5X OK. |
| 20% flex | 3X, 2X OK. |
| Heat shock | 20% 3X 2X OK. |
| 42% elongation | No lift, no cracks. |
| Thermoplastic flow | 400° C., 402° C. |
| Progressive burnout to 44 amps. | 736 sec. |

Maximum speed on the 12 ft. horizontal oven was 30 feet per minute.

EXAMPLE III

Using the amide-imide polymer described in Example II, the following coating composition was used to coat 18 AWG copper wire on a 12 ft. horizontal oven at 20 f.p.m.:

|  | Percent by weight |
|---|---|
| Amide-imide polymer | 70.0 |
| Benzoyl benzoate | 26.2 |
| 1.4 butanediol | 3.8 |
| Triphenyl phosphite | 0.5 |
| Dicyandiamide | 0.3 |

The resultant magnet wires prepared at different oven temperatures are tabulated hereinbelow:

TABLE II

| Test | 390° C. | 405° C. | 420° C. |
|---|---|---|---|
| Build | 2.0 | 1.9 | 1.8 |
| Coating surface | Smooth | Smooth | Smooth |
| Full snap | +2X OK | | +3X OK |
| Snap | | +3X OK | |
| 20% elongation | +3X, 2X OK | 3X, 2X, 1X OK | 3X, 2X, 1X OK |
| Heat shock | 3X, 2X OK | Same | 20% 3X, 2X, 1X OK |
| ITC scrape | 1,000 ave | 970 ave | 996 ave. |
| G.E. scrape | 100+ ave | 100+ ave | 100+ ave. |
| 40% elongation | No lift, no crkcks | | |
| Solvent resistance | OK | OK | OK. |
| Thermoplastic flow mill | | | 370°–400° C. |
| Burnout to 44 amps | | | 734.8 sec. |
| Maximum speed | | | 27½ f.p.m. |

EXAMPLE IV

Using the same amide-imide polymer of Example II, the following coating composition was used to coat 18 AWG copper wire on a 12 ft. horizontal oven at 17 f.p.m.:

|  | Percent by weight |
|---|---|
| Amide-imide polymer | 75.0 |
| Benzyl benzoate | 10.0 |
| 1,4 butanediol | 15.0 |

Six coats were applied to the copper wires. The magnet wire prepared at different operational conditions is tabulated hereinbelow:

TABLE III

| Test | 390° C. | 405° C. | 420° C. |
|---|---|---|---|
| Coating surface | Smooth | Slightly sandy | Fairly smooth. |
| Snap | +4X | | |
| Full snap | | +3X OK | +4X OK. |
| ITC scrape | 920 ave | 800 ave | 857 ave. |
| G.E. scrape | 100+ | 100+ | 100+ |
| 40% elongation | No lift, no cracks | No lift, no cracks | No lift, no cracks. |
| 20% snap | 3X, 2X, 1X OK | 3X, 2X OK | +3X, 2X OK. |
| Heat shock [1] | All OK | 20% 3X, 2X OK | 3X, 2X OK. |
| Thermoplastic flow [2] | | | 370°–390° C. |

[1] 1 hr. at 150° C.
[2] Will run at 28 f.p.m. on 12 ft. horizontal.

EXAMPLE V

The following coating composition was used to coat 18 AWG copper wire on a 12 ft. vertical dieless unit:

|  | Percent |
|---|---|
| Amide-imide polymer | 95 |
| 1,4 butanediol | 5 |

The following results were obtained:

TABLE IV

| Test | A | B |
|---|---|---|
| Temperature | 460° C. | 460° C. |
| Built | 1.4 mil 5 coats | 1.4 |
| Surface | Smooth | Smooth. |
| Rate | 40 f.p.m. | |
| Roller speed | 160 f.p.m. | |
| Wiper roller speed | 300 f.p.m. | |
| Concentricity | 1:1 | 1:1 |
| Dielectric | 5,980 volts | 7,480 volts. |
| Thermoplastic flow | 420° C | 445 |
| 20% 3X, 2X, 1X | | OK. |
| Full snap | | +2X OK. |
| Mandrel pull | | 11 |

EXAMPLE VI

Amide-imide polymer prepared with the solvent was used for preparing the coating composition of the invention. The composition was as follows:

|  | Percent by weight |
|---|---|
| Amide-imide polymer (solids) | 28.0 |
| N-methyl pyrrolidone | 33.6 |
| WES oil | 11.3 |
| Benzoyl benzoate | 22.3 |
| 1,4 butanediol | 4.8 |
| Dicyandiamide | 0.3 |
| Triphenylphosphite | 0.5 |

The viscosity of the composition was 55 poises at 25° C. The 18 AWG copper wire was coated on a 12 ft. horizontal unit. The following represents results on the magnet wire prepared at three different temperatures:

TABLE V

| Test | 390° C. | 405° C. | 420° C. |
|---|---|---|---|
| Speed | 17 f.p.m. | 17 f.p.m. | 17 f.p.m. |
| Max. speed | | | 33 f.p.m. |
| G.E. scrape | 100+ ave | 100+ ave | 100+ ave. |
| ITC scrape | 787 ave | 940 ave | 1,207 ave. |
| Snap | Full+4X OK | +4X OK | +3X OK. |
| 20% elongation | 3X, 2X, 1X, wrap, OK | 3X, 2X, 1X OK | 3X, 2X, 1X OK. |
| Heat shock at 150° for 1 hr. | 3X, 2X, 1X OK | 3X, 2X, 1X OK | 3X, 2X, 1X OK. |
| 20% elongation | | | |
| 41% elongation to break | No bare copper, no lift, no cracks | | |
| 42% elongation to break | | No bare copper, no lift, no cracks | |
| 46% elongation to break | | | No bare copper, no lift, no cracks. |
| Solvent test | DMAC 30 sec., OK, no cracks | DMAC OK, no cracks | DMAC OK, no cracks. |
| Burnout | | 594–5 sec., 743.5 sec. –44 amps | 758.9 sec. at 44 amps. |
| Build | 2.3 mils | 2.2 mils | 2.2 mils. |

I claim:

1. A magnet wire coating composition comprising (a) an amide-imide polymer, (b) a solvent system for said polymer, and (c) at least one of the following additives: (1) trace amounts up to 15% by weight of the composition of 1,4 butanediol, and (2) trace amounts up to 30% by weight of the composition of benzyl benzoate, and said composition containing about 5%–35% by weight of solids.

2. A magnet wire coating composition of claim 1 wherein the composition contains both 1,4 butanediol and benzyl benzoate.

3. A magnet wire coating composition of claim 1 wherein the composition contains only benzyl benzoate.

4. A magnet wire coating composition of claim 1 wherein the composition contains only 1,4 butanediol.

5. A magnet wire coating composition of claim 1 wherein the composition contains in addition 0.1% to 0.5% by weight of triphenylphosphite and 0.1% to 0.5% by weight of dicyandiamide.

6. A magnet wire comprising a conductor and coated thereon a cured polymeric layer of a coating composition according to claim 1.

7. A magnet wire according to claim 6 wherein the coating composition contains 1,4 butanediol and benzyl benzoate.

8. A magnet wire of claim 6 wherein the coating composition contains 1,4 butanediol.

9. A magnet wire of claim 6 wherein the coating composition contains benzyl benzoate.

10. A magnet wire of claim 6 wherein the coating composition contains 0.1%–0.5% by weight of triphenylphosphite and 0.1%–0.5% by weight of dicyandiamide.

References Cited

UNITED STATES PATENTS

| | | | |
|---|---|---|---|
| 3,320,202 | 5/1967 | Bolton et al. | 260—30.2 |
| 3,355,427 | 11/1967 | Loncrini | 260—33.4 |
| 3,364,166 | 1/1968 | Barito | 260—30.2 |
| 3,440,203 | 4/1969 | Boldebuck et al. | 260—33.4 |

ALLAN LIEBERMAN, Primary Examiner

U.S. Cl. X.R.

260—30.2, 33.4, 78; 117—232